US012741580B2

(12) United States Patent
K S et al.

(10) Patent No.: US 12,741,580 B2
(45) Date of Patent: Sep. 22, 2026

(54) LOWER BUNK SYSTEM FOR AN INDUSTRIAL VEHICLE

(71) Applicant: Volvo Truck Corporation, Gothenburg (SE)

(72) Inventors: Madhuchandra K S, Bangalore (IN); K S Sudeendra Thirtha Koushik, Bangalore (IN); Gangubai Hegde, Thindlu (IN)

(73) Assignee: Volvo Truck Corporation, Gothenburg (SE)

( * ) Notice: Subject to any disclaimer, the term of this patent is extended or adjusted under 35 U.S.C. 154(b) by 216 days.

(21) Appl. No.: 18/350,020

(22) Filed: Jul. 11, 2023

(65) Prior Publication Data

US 2024/0017659 A1 Jan. 18, 2024

(30) Foreign Application Priority Data

Jul. 12, 2022 (EP) .................................... 22184360

(51) Int. Cl.
*B60P 3/39* (2006.01)
*B62D 33/06* (2006.01)

(52) U.S. Cl.
CPC ............ *B60P 3/39* (2013.01); *B62D 33/0612* (2013.01)

(58) Field of Classification Search
CPC ..... B62D 33/0612; B60P 3/39; B60N 2/4221; B60N 3/008; B60N 2/427; B60N 2/305; B60N 2/42; A47C 19/04; A47C 17/80; A47C 17/04
USPC ............................................................. 5/118
See application file for complete search history.

(56) References Cited

U.S. PATENT DOCUMENTS 2,565,417 A * 8/1951 Woller .................. A47C 17/40 5/147
4,637,081 A * 1/1987 Clark ..................... B63B 29/04 297/65
4,818,019 A * 4/1989 Mrotz, III ............... A47C 7/44 248/575

(Continued)

FOREIGN PATENT DOCUMENTS

CN 110077297 A * 8/2019
EP 1384621 A2 1/2004

(Continued)

OTHER PUBLICATIONS

Extended European Search Report for European Patent Application No. 22184360.0, mailed Dec. 15, 2022, 7 pages.

*Primary Examiner* — Justin C Mikowski
*Assistant Examiner* — George Samuel Gines
(74) *Attorney, Agent, or Firm* — Withrow & Terranova, PLLC

(57) ABSTRACT

A bunk system for a truck, comprising a structural board, wherein the structural board comprises a main portion having a main front edge, extending in the longitudinal direction, and a main rear edge; and at least a movable secondary portion linked elastically to the main portion, having a secondary rear edge, and a secondary front edge. The secondary portion is movable between a first position in which the main rear edge, the main front edge, the secondary rear edge, and the secondary front edge are substantially in a same plane and the secondary portion may move in at least one of a translation or a rotational motion into a second position in the event of a crash, thereby contracting the length of the bunk.

9 Claims, 4 Drawing Sheets

(56) References Cited

U.S. PATENT DOCUMENTS

| | | | | |
|---|---|---|---|---|
| 6,899,379 | B1 * | 5/2005 | Milenovich | B62D 33/0612 297/14 |
| 10,596,927 | B2 * | 3/2020 | Herrera Barrera | B60N 2/3065 |
| 11,077,816 | B1 * | 8/2021 | Bates | B60R 21/013 |
| 2015/0135432 | A1 * | 5/2015 | Murphy | A47C 17/16 5/29 |
| 2020/0164779 | A1 * | 5/2020 | Bosstick | B60N 2/60 |
| 2021/0353072 | A1 * | 11/2021 | Aldrich | A47C 19/22 |

FOREIGN PATENT DOCUMENTS

| | | | | |
|---|---|---|---|---|
| EP | 1384621 | A3 | 3/2005 | |
| SE | 536498 | C2 | 1/2014 | |
| WO | WO-02076265 | A1 * | 10/2002 | A47C 17/80 |
| WO | 2017116362 | A1 | 7/2017 | |
| WO | 2020222638 | A1 | 11/2020 | |
| WO | 2020222642 | A1 | 11/2020 | |

* cited by examiner 4
12
8
26A
10
26B
24
26
2

224
28
204
220
30
22
222
202
202
20
200
202
22
30
28
204

4
12
22
30
20
32
10
6
26
2

34
22
12
20
10

26
24
2

LOWER BUNK SYSTEM FOR AN INDUSTRIAL VEHICLE

RELATED APPLICATIONS

The present application claims priority to European Patent Application No. 22184360.0, filed on Jul. 12, 2022, and entitled "LOWER BUNK SYSTEM FOR AN INDUSTRIAL VEHICLE," which is incorporated herein by reference in its entirety.

TECHNICAL FIELD

This disclosure relates to a lower bunk system for an industrial vehicle.

BACKGROUND ART

Industrial vehicles such as trucks are equipped with a cabin for the driver. The cabin comprises often two seats and also one or more beds or bunks. A bunk is usually placed behind the seats, at the same height as the seats of higher than the seats. The present disclosure concerns more particularly the case of a bunk placed at the same height than the seats. Such a bunk is called "lower bunk" in the present document.

A lower bunk system mainly comprises a structural base on which a mattress rests. The driver (or another occupant) can rest on the mattress when the truck is stopped. The space under the structural base may be used as a lower storage space. The whole system (structural base and mattress) is placed between the seats and a rear wall of the cabin and may be tiltable against a hinge axis located towards said rear wall. The structural base is rigid for supporting the occupant and the mattress, between the structural base and the occupant when he rests on the bunk, provides comfort for the occupant.

In the event of a crash, from the front or from the rear, the seats move closer to the rear wall for the safety of the driver and of the passenger(s) because a survival space between the dash and/or the steering wheel must be maintained. For the safety of the occupant(s), the lower bunk should not obstruct the movement of the seats.

When a crash happens, predominantly forces act from two directions on the occupant: a force is exerted from the front and an intrusion happens toward the occupant who should be as far as possible during this intrusion. The seat may be pulled back to create more space between the steering wheel (or the dash) and the occupant.

- a force is exerted from the rear: due to inertia effect, the mass installed behind the rear wall will intrude towards the front of the cabin. Rigid parts whatsoever in between the seat and the rear wall will hit an occupant towards the front and thereby will reduce the survival space of the occupant.

WO2020/222638 discloses a bed platform laying transverse to a vehicle behind one or more occupant seats inside the vehicle comprising a central portion and one or more outer portions. The bed platform's central portion aligns with a center line of the vehicle and the outer portions extend behind the seat in a lateral direction of the vehicle relative to the longitudinal direction of the vehicle. The central portion and/or outer portions have weakened connector portions connecting the central portion to the vehicle cabin and/or the outer portions. The weakened connector portions align with an inner side surface of the one or more occupant seats. The weakened connector portions allow the central portion to move forward past the occupant seats and the outer portions to remain behind the occupant seats by disconnection and/or deformation of the weakened connector portions from the central portion.

WO2020/222642 relates to a slatted bed platform laying transverse to a vehicle behind one or more occupant seats inside the vehicle comprising a supporting beam structure forming a central portion and one or more outer portions. The bed platform's central portion aligns with a center line of the vehicle and the outer portions extend behind the seat in a lateral direction of the vehicle relative to the longitudinal direction of the vehicle. The supporting beam structure has weakened connector portions connecting the central to the vehicle cabin and/or the outer portions. The weakened connector portions allow the central portion to move forward past the occupant seats and the outer portion to remain behind the occupant seats by disconnection and/or deformation of the weakened connector portions from the central portion.

These prior art documents teach a structure in three (in most cases) parts: one lateral part behind each seat, a central part (between two lateral parts) and weakened connector portions therebetween. The proposed structures of the bunk work but are complex and also expensive.

An aim of the present disclosure is to provide additional room for seat occupants in the event of a crash, either frontal or rear. In case of a crash with a front force, when the seat is pulled back, there is a need of enough room for the occupant of the seat. In case of a crash with a rear force, there is a need to ensure that forces coming from the rear are not transferred to the seat and to the occupant, for example by the lower bunk. The proposed solution will be an alternative solution and will be preferably less expensive than prior art solutions.

SUMMARY

To achieve this goal, a bunk system for an industrial vehicle, namely a truck, comprising a structural board designed for receiving a mattress and an occupant and having a length defining a longitudinal direction and a width smaller than the length and defining a transversal direction is proposed. This structural board comprises:

- a main portion extending substantially along its entire length and having a front edge, or main front edge, extending in the longitudinal direction, and an opposite edge, or main rear edge, and
- at least a movable secondary portion linked elastically to the main portion, having a rear edge, or secondary rear edge, in regard to the main front edge and a front edge, or secondary front edge, opposite to the secondary rear edge.

The secondary portion is movable between a first position in which the main rear edge, the main front edge, the secondary rear edge and the secondary front edge are substantially in a same plane and, according to some examples, a second position in which the secondary front edge is closer to the main back edge than in the first position. In some further examples, secondary portion may move in rotation relative to the main portion, the secondary portion being hinged to the main front edge of the main portion. In some further examples, secondary portion may extend substantially along the entire length of the bunk system. The main front edge and a secondary rear edge may be elastically hinged, and a guiding means may be provided for guiding the secondary front edge to move the secondary portion into the second position.

The proposed solution in an original manner allows to the secondary front edge to move in a direction which is perpendicular to this secondary front edge. It therefore proposes to "contract" the bunk, i.e., to limit its width at least locally, for example behind a seat.

According to a first example, the at least one movable secondary portion may move in translation relative to the main portion. In this example, the secondary portion can "follow" a seat which is pulled back in a cabin of a truck and has thereby the same movement than the seat.

For this first example, the main portion/a secondary portion may comprise for example at least two shafts and the secondary portion/the main portion may comprise at least two tubes in which the shafts can slide, wherein a coil spring is advantageously arranged around each shaft between the main portion and the secondary portion. This example can be compared to a push latch without latching (or with latching). It is a structure which is light, resistant and cheap since it is easy to adapt to a structural board of a bunk.

In a second example, the at least one movable secondary portion may move in rotation relative to the main portion, the at least one movable secondary portion being hinged to the main front edge of the main portion. This example is compact and is adapted to relatively large reduction of the width of the bunk. In this example, according to an example, the secondary front edge can bear a sloped face. This sloped face may be designed to cooperate with an actuator for initiating a movement of rotation of the secondary portion.

According to a third example, only one movable secondary portion may be foreseen, wherein the secondary portion may extend substantially along the entire length of the bunk system, wherein the main front edge and the secondary rear edge may be elastically hinged, and wherein the bunk system may further comprise guiding means for guiding in translation the secondary front edge. This example limits the number of parts of the bunk system.

Thus, in the event of a crash, a pre-stress force of an elastic member, which elastically couples the secondary portion to the main portion, causes the position of the secondary portion move either translationally or angularly causing the bunk system to contract thereby providing survival space for driver/passenger. In one example, the secondary rear edge of the secondary portion is closer to the main front edge due to translational motion whereby the bunk system contracts.

The present disclosure also concerns a truck comprising a cabin having a rear wall, at least one seat and a lower bunk system between the at least one seat and the rear wall. According to this disclosure, the bunk system is a bunk system according to any one of examples proposed here above, wherein the longitudinal direction of the bunk system may be substantially perpendicular to the displacement direction of the truck.

In this truck, the bunk system, namely the main portion of the bunk system, may be hinged to the rear wall of the cabin. This allows an access to the space below the bunk.

The cabin of the truck may also comprise a lower storage space below the bunk system and limited by the rear wall, a floor of the cabin, the bunk system and a forward wall, wherein the forward wall may be below or behind the secondary front edge in the second position of the bunk system. In this configuration, the partition does not disturb a movement backwards of the seat.

In the truck, the bunk system may be a bunk system according to the first or the second example hereabove, wherein there may be a secondary portion between each seat and the main portion of the bunk system. In this case, when the secondary front edge bears a sloped face, the corresponding seat may comprise an actuator designed to cooperate with the sloped face in order to pivot the corresponding secondary portion.

A truck according to the disclosure may comprise two seats.

A truck according to the disclosure may also comprise means for pulling back each seat towards the rear wall when a crash occurs.

BRIEF DESCRIPTION OF DRAWINGS

Other features, details and advantages will be shown in the following detailed description and on the figures, on which.

DETAILED DESCRIPTION

In order to make the figures easier to read, the various elements are not necessarily represented to scale. In these figures, identical elements receive the same reference number. Certain elements or parameters can be indexed, i.e., designated for example by first element or second element, or first parameter and second parameter, etc.

Figure 1:
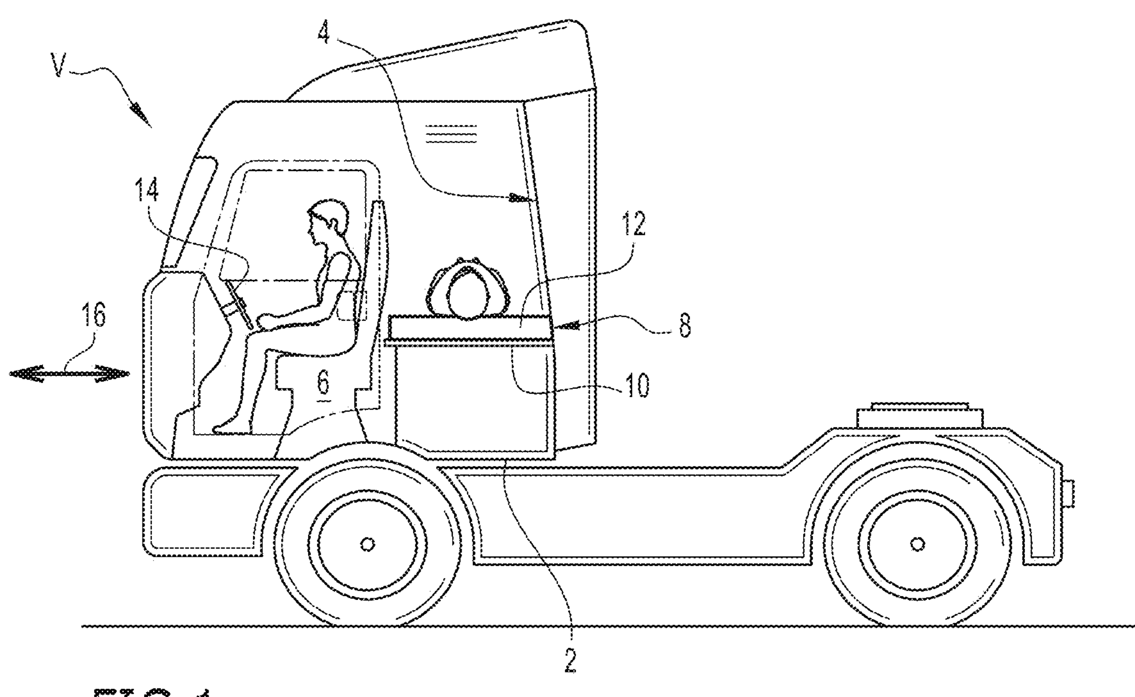
FIG. 1 is a schematic view of a truck with a lower bunk.
Figure 2:
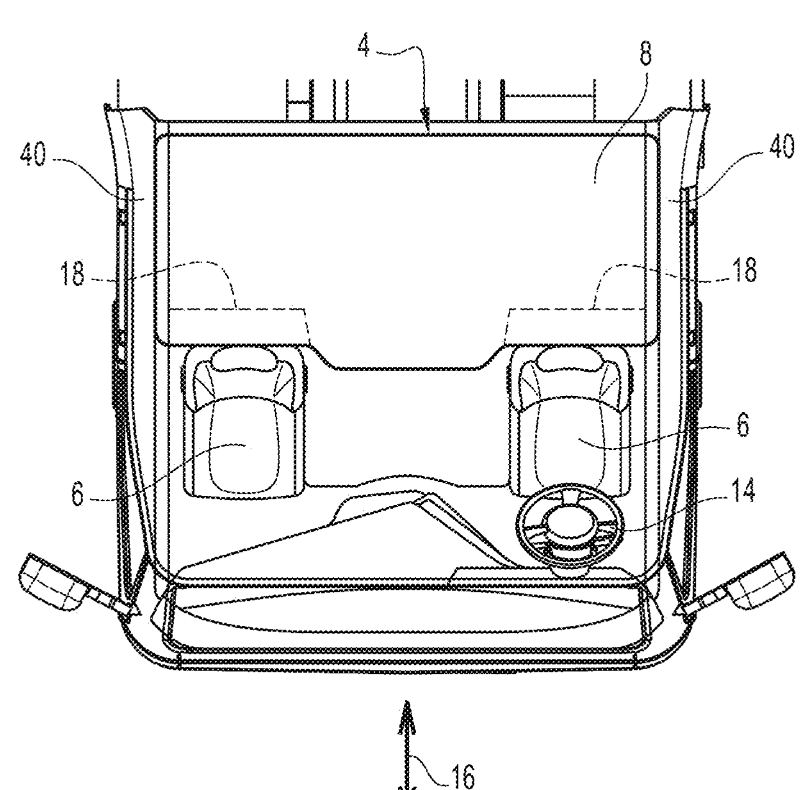
FIG. 2 is a schematic top view of a cabin with a lower bunk in accordance to the disclosure.

FIG. 1 shows an industrial vehicle V, or truck. It comprises a cabin with a cabin floor 2, a rear wall 4, at least a seat 6 and a bunk 8. In the non-limitative example shown on the figures, the cabin comprises two seats 6 (FIG. 2). The bunk is also named lower bunk 8 since it is placed between the seats 6 and the rear wall 4. In some cases, not concerned by the present disclosure, the bunk can be placed at a higher level than the seats and is then a "higher" bunk. FIG. 1 also shows a driver, or occupant, which mainly seats on a seat 6, the driver's seat in regard to a steering wheel 14 or lies on the bunk 8 when the truck is stopped. The bunk 8 comprises a structural board 10 and a mattress 12 covering the structural board 10.

FIG. 1 shows a truck which can receive a lower bunk according to present disclosure (but shown here with a prior art lower bunk).

FIG. 2 is a top view of the cabin of the truck of FIG. 1. The bunk 8 has a substantially rectangular shape having a length defining a longitudinal direction for the bunk 8 and a width which is smaller than the length. The bunk 8 is oriented so that the longitudinal direction of the bunk 8 is perpendicular to the displacement direction 16 of the truck.

The present disclosure provides necessary survival space/cushioning effect to the occupant in case of a frontal crash or a rear crash. Starting from the configuration of the lower bunk 8 shown on FIGS. 1 and 2, the disclosure proposes to split the structural board 10 along a line extending mainly along the longitudinal direction of the bunk 8. The split line 18 can extend in longitudinal direction along all the length of the bunk 8 (example of FIG. 9) or only behind the seats 6 as shown on FIG. 2 (corresponding to the examples of FIGS. 4-8). In the case shown on FIGS. 2 and 4, the split line 18 also comprises a portion extending along the width of the bunk 8. The split line 18 divides the bunk 8, more especially the structural board 10, into a main portion 20 and at least one (two in the examples of FIGS. 2 and 4-8) secondary portions 22.

Figure 3:
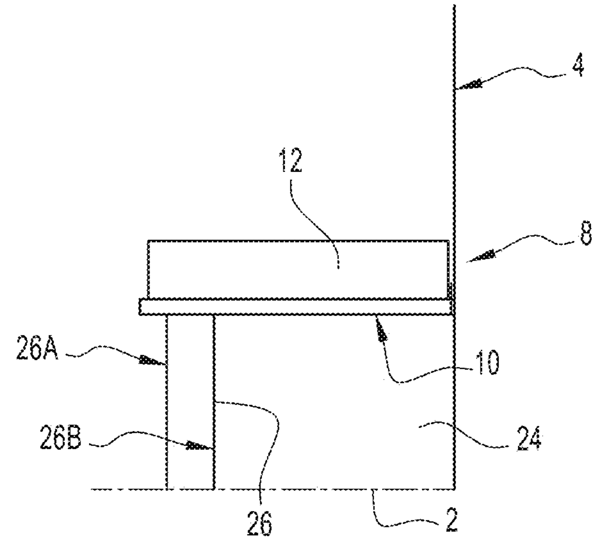
FIG. 3 is a schematic side view of a first modification brought by the disclosure to a lower bunk of the prior art.

The disclosure advantageously also proposes to "reduce" a lower storage space 24 (FIG. 3) in a preferred example. Usually, the space below a lower bunk forms a storage space. This lower storage space 24 is formed between the cabin floor 2 and the bunk 8 on the one side and between the rear wall 4 and a partition 26 on the other side. Starting from a prior art configuration, the partition 26 is moved backward, i.e., it is brought closer to the rear wall 4. The displacement of the partition 26 is for example about 100 mm (for example between 50 and 250 mm). On FIG. 3, 26A shows a position of partition 26 corresponding to the prior art and 26B a position of partition 26 according to the present disclosure.

Three alternative examples are proposed thereafter. According to a first example, a space is left free between each secondary portion 22 and the main portion 20 of the structural board. According to a second example, each secondary portion can bend and is pivoting in regard to the main portion. According to the third example, the entire bunk can be folded with the split line in-between. These examples are described more in details hereafter in relation to the corresponding figures.

According to the first example (FIGS. 4-6), the secondary portions 22 can move in translation relative to the main portion 20. As shown on FIG. 4, in "normal" conditions, i.e., with no constraint exerted on the secondary portion 22, a free space 28 exists between the considered secondary portion 22 and the main portion. Shaft(s) 30, preferably at least two shafts, extend between each secondary portion 22 and the main portion 20. The shafts 30 can be carried either by the secondary portions 22 or by the main portion 20. The portion that does not carry the shafts 30 comprises tubes (not shown) for receiving and guiding the shafts 30. The portion of each shaft 30 extending between a secondary portion 22 and the main portion 20 is surrounded by a coil spring 32. The shafts 30 and the coil springs 32 are designed so that each secondary portion 22 can moved relative to the main portion 20 about a predetermined stroke, for example between 50 and 250 mm, for example 100 mm.

Figure 4:
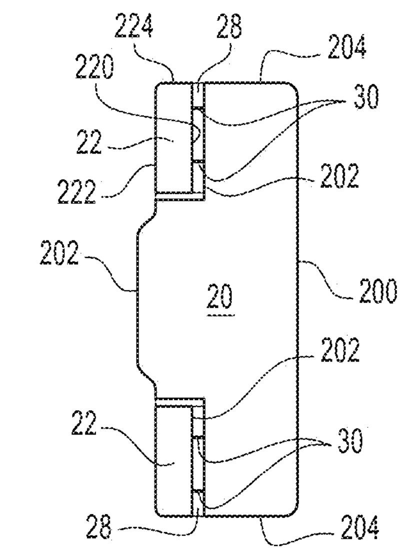
FIG. 4 is a schematic top view of a second modification brought by the disclosure to a lower bunk of the prior art.
Figure 5:
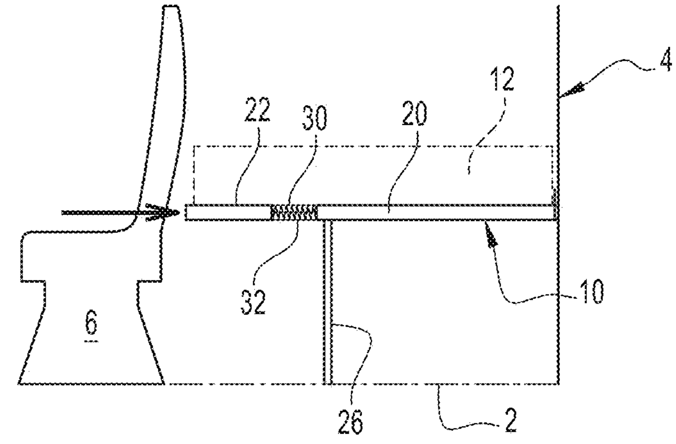
FIG. 5 is a schematic side view of a first example of a lower bunk according to the disclosure.
Figures 6, 7:
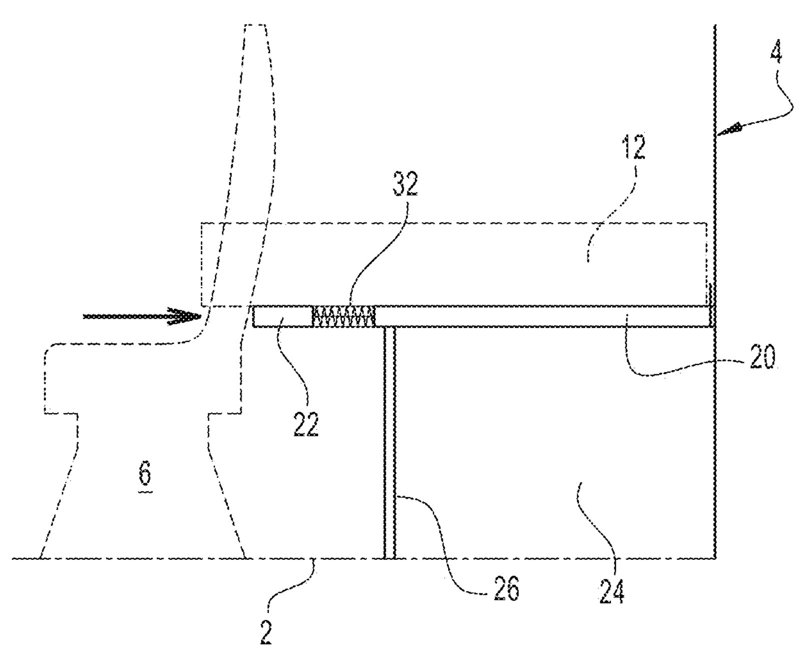
FIG. 6 is a schematic side view corresponding to FIG. 5, with a seat in a backward position.
FIG. 7 is a detailed side view of a second example of a lower bunk according to the disclosure.

The main portion 20 of the structural board 10 comprises a rear edge, or main rear edge 200 extending along the rear wall 4. This main rear edge 200 can be hinged to the rear wall 4 so that the bunk can be raised up by pivoting, providing thereby an access to the lower storage space 24. The main portion 20 also has a front edge, or main front edge 202 opposite to the main rear edge 200. This main front edge 202, in the example of FIGS. 4-6 is omega-shaped. Lateral edges, or main lateral edges 204, connect the main front edge 202 to the main rear edge 200.

Each secondary portion also comprises a rear edge, or secondary rear edge 220, a front edge, or secondary front edge 222, and lateral edges or secondary lateral edges 224 connecting the secondary rear edge 220 to the secondary front edge 222. Each secondary rear edge 220 is facing the main front edge 202 and each secondary front edge 222 is facing a seat 6.

Concerning the mattress 12, no change is foreseen. It still covers the structural board 10. With it, an occupant does not remark that the structural board 10 comprises several portions and the comfort of an occupant resting on the bunk is not affected.

The partition 26 can also be omega-shaped. It can be placed below the main front edge 202 or slightly behind (closer to the rear wall 4) than the main front edge 202.

FIG. 5 is a side view of the bunk of FIG. 4 in normal conditions, i.e., prior to a crash for example. The secondary portions 22 are far from the main portion 20 and the coil spring 32 is in an uncompressed state. For the comfort of an occupant resting of the bunk 8, the bunk 8 in its width occupies as much space as possible between the seats 6 and the rear wall 4. The secondary portions 22 of the structural board 10 (and the mattress 12) are so near as possible from the seats 6 to optimize the space available in the cabin.

Once a crash happens, the seat is pulled back towards the rear wall 4. The corresponding system (for pulling the seat) is known from a person with ordinary skill in the art. When the seat is pulled backwards, since the seat 6 is very near of the bunk 8, each seat 6 comes rapidly in contact with the bunk 8, and more specifically with the secondary portion 22 facing the considered seat 6. Each seat 6 pushes the spring-loaded secondary portion 22 of the structural board 10 to move rearward. In this movement, the secondary rear edges 220 get closer to the main front edge 202. During this movement, which is a translation, the main rear edge 200, the main front edge 202, the secondary rear edges 220 and the secondary front edges 222 (and also the lateral edges) remain substantially in a same plane.

The stroke of the movement of the secondary portions 22 is adapted to the stroke of the corresponding seat 6. Preferably, the stroke of the movement of the secondary portions 22 can be slightly greater than the stroke of the seat 6.

During a crash, the deformation of the mattress is not taken into account and the forces exerted by the mattress are considered as negligible.

Figure 8:
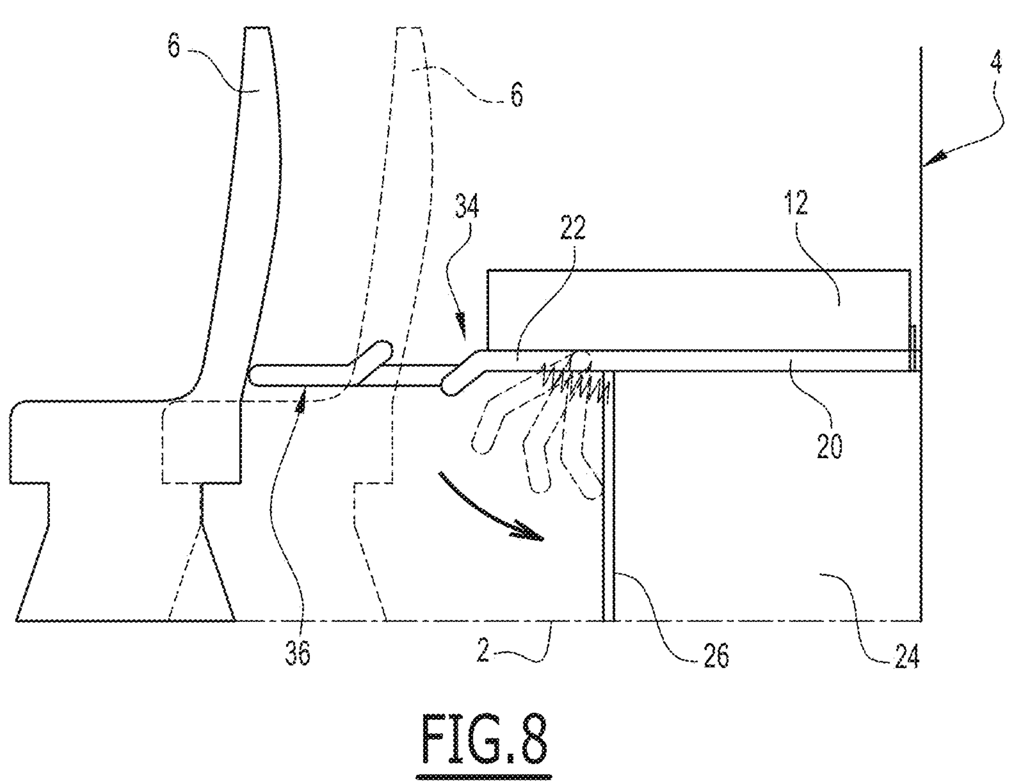
FIG. 8 is a side view of the second example showing a seat in a forward position and in a backward position.

FIGS. 7 and 8 show the second example of a lower bunk according to the present disclosure. According to this example, there are also a main portion 20 with a main rear edge 200, a main front edge 202 and main lateral edges 204; two secondary portions 22 each with a secondary rear edge 220, a secondary front edge 222 and secondary lateral edges 224. The form of the main portion 20 of this second example can be the same as the form of the main portion 20 of the first example.

This second example differs from the first one namely in that each secondary portion 22 does not translate relative to the main portion 20 but pivots. The secondary rear edge 220 of each secondary portion 22 is hinged to the main front edge 202. As shown on FIGS. 7-8, the secondary front edge 222 also differs from the corresponding edge of the first example in that it comprises a sloped face.

Each secondary portion 22 is pre-stressed by a spring which maintains it in a resting position. In this position, the secondary portion 22 is substantially coplanar with the main portion 20.

When a crash occurs, each secondary portion 22 pivots around the main front edge 202 downwards, and can pivot eventually until coming into contact with partition 26.

As shown on FIG. 8, each seat 6 advantageously comprises an actuator 36 designed for cooperating with the sloped face 34 of the secondary portion 22. The actuator is a rigid part and is for example metallic. When the seat 6 is pulled back, the actuator 36 comes in contact with the sloped face 34 of the secondary portion 22. When it goes further back, it pushes the secondary portion 22 down and the secondary portion 22 pivots down towards the partition 26 and stresses the elastic means between the secondary portion 22 and a fixed part, for example the main portion 20 of the structural board or a fixing point of the partition 26. The elastic means can also be incorporated in the hinge between the secondary portion 22 and the main portion 20. The pre-stress force of the elastic means is high enough to allow an occupant resting on the bunk 8 without causing a swivelling of the secondary portion(s). On another side, the pre-stress force of these elastic means is also predicted by the amount of force generated during a crash.

Figure 9:
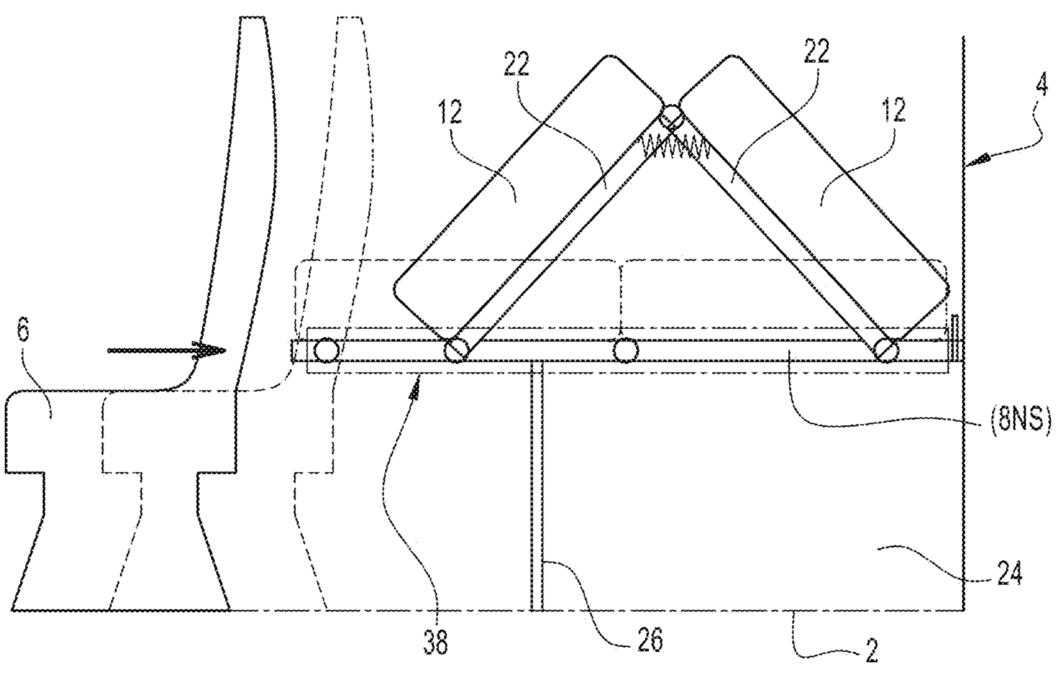
FIG. 9 is a view corresponding to FIG. 8 for a third example of a lower bunk according to the present disclosure.

FIG. 9 shows the third example. This example foresees that the entire bunk buckles in case of a crash. In this example, there is only one secondary portion 22. In the example as shown, the split line between the main portion 20 and the secondary portion is a middle line (along the length) of the bunk. The split line extends over all the length of the bunk and can be positioned in another position as the central position. The width of the secondary portion 22 should be at least as great as the stroke of the seats when they are pulled back. The mattress 12 can also be divided into two mattresses but the system also works with a mattress 12 covering all the structural board 10 (main portion 20 and secondary portion 22). The secondary portion 22 is hinged to the main portion 20 which on its turn is hinged to the rear wall 4. In other words, the main front edge 202 is hinged to the secondary rear edge 220. The hinge between the main portion 20 and the secondary portion 22 is pre-stressed so that in the resting position the main portion and the secondary portion are coplanar.

The secondary front edge 202 has two ends which are guided along a substantially horizontal direction, i.e., parallel to the cabin floor 2. For example, each end of the secondary front edge 202 can be provided with a pin extending outwardly. This pin can cooperate with for example a rail or be guided in a C-profile 38. The rail or the C-profile (or other guiding means) can be attached to a side wall 40 (FIG. 2) of the cabin.

A buckling of the lower bunk 8 happens with a movement of the secondary portion 20 caused by a movement backwards of the seats 6 against the secondary front edge 222 of the secondary portion, since the secondary front edge 222 is guided horizontally.

FIG. 9 shows the bunk 8 in a normal state (NS) and in its bucked state. The seat 6 is also shown in his normal position and in its pulled back position (dotted line).

The three proposed solutions and their variations work as good for a crash from the front than for a crash from the rear. They guarantee the survival space of the occupant of the seat in case of a crash. The lower bunk does not disturb the movement of the seat when it is pulled backwards. The proposed solutions are clearing the obstruction which otherwise would stop the seat from moving behind and work also when the force is coming from the rear of the cabin due to the inertia load coming from different sources like the trailer and/or compressed natural gas (CNG) system or hydrogen fuel system fitted behind the rear wall of the cabin.

The proposed solutions allow to maximise the size of the bunk without limiting the security on board.

The solutions disclosed hereabove are also easy to adapt to prior art bunks.

This disclosure is not limited to the three systems and their variations described here, which are only examples. The present disclosure encompasses every alternative that a person skilled in the art would envisage when reading this text.

The invention claimed is:

1. A bunk system for a vehicle, comprising a structural board to receive a mattress and an occupant thereon, the structural board comprising:

a main portion having a main front edge proximate a front of the vehicle; and at least one movable secondary portion having a secondary rear edge proximate the main front edge of the main portion, and a secondary front edge opposite to the secondary rear edge; and at least one coupling between the main portion and the at least one movable secondary portion, the at least one coupling configured to bias the at least one movable secondary portion in a deployed position in which the main portion and the at least one movable secondary portion are coplanar;

wherein the at least one movable secondary portion is movable via the at least one coupling from the deployed position to a collapsed position upon a rearward lateral force of a front seat of the vehicle on the main front edge of the at least one movable secondary portion to reduce resistance to the rearward lateral force; and wherein the at least one movable secondary portion is movable in rotation relative to the main portion, the at least one movable secondary portion being hinged to the main front edge of the main portion.

2. The bunk system of claim 1, wherein the at least one movable secondary portion extends substantially along the entire length of the bunk system;

wherein the main front edge and the secondary rear edge are elastically hinged; and wherein the bunk system further comprises guiding means for guiding the secondary front edge in translation.

3. The bunk system of claim 1, wherein the at least one movable secondary portion performs at least one of a translational movement and a rotation movement with respect to the main portion, thereby causing the bunk system to contract an elastic member between the main portion and the at least one movable secondary portion.

4. A truck comprising a cabin having a rear wall, at least one seat, and the bunk system of claim 1 between the at least one seat and the rear wall.

5. The truck of claim 4, wherein the main portion of the bunk system is hinged to the rear wall of the cabin.

6. The truck of claim 4, wherein the cabin comprises a lower storage space that is arranged below the bunk system, the lower storage space being circumscribed by the rear wall, by a floor of the cabin, by the bunk system, and by a forward wall; and wherein the forward wall is below or behind the secondary front edge, when the at least one movable secondary portion is in a second position.

7. The truck of claim 4, wherein the truck comprises actuators configured to pull back each of the at least one seat towards the rear wall, upon occurrence of a crash.

8. The truck of claim 4, wherein the main portion is hinged to the rear wall;

wherein the main front edge is hinged to the secondary rear edge; and wherein the at least one movable secondary portion is configured to move from the first position to a second position in such a way that the secondary front edge glides translationally along guiding means causing the at least one movable secondary portion to rotate with respect to the main portion and causing the main portion to rotate with respect to the rear wall.

9. The bunk system of claim 1, wherein the at least one coupling elastically hinges the at least one movable secondary portion to the main portion;

wherein the at least one movable secondary portion is pivoted upon occurrence of a crash from the deployed position to the collapsed position.

* * * * *